US011231390B2

(12) United States Patent
Carrabba et al.

(10) Patent No.: US 11,231,390 B2
(45) Date of Patent: Jan. 25, 2022

(54) CHLORINE, OXIDATION—REDUCTION POTENTIAL (ORP), AND PH MEASUREMENT PROBE

(71) Applicant: HACH COMPANY, Loveland, CO (US)

(72) Inventors: Michael Carrabba, Ashland, OR (US); Corey Salzer, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 550 days.

(21) Appl. No.: 16/310,378

(22) PCT Filed: Jun. 16, 2016

(86) PCT No.: PCT/US2016/037913
§ 371 (c)(1),
(2) Date: Dec. 14, 2018

(87) PCT Pub. No.: WO2017/217999
PCT Pub. Date: Dec. 21, 2017

(65) Prior Publication Data
US 2019/0331636 A1 Oct. 31, 2019

(51) Int. Cl.
*G01N 27/416* (2006.01)
*G01N 27/36* (2006.01)
*G01N 27/403* (2006.01)

(52) U.S. Cl.
CPC ......... *G01N 27/4167* (2013.01); *G01N 27/36* (2013.01); *G01N 27/403* (2013.01); *G01N 27/4168* (2013.01)

(58) Field of Classification Search
CPC ............... G01N 27/4167; G01N 27/36; G01N 27/403; G01N 27/4168
See application file for complete search history.

(56) References Cited

U.S. PATENT DOCUMENTS 3,497,442 A * 2/1970 Louis-Claude ..............................
G01N 33/48707
204/411
2005/0258038 A1* 11/2005 Harima .............. G01N 27/4168
204/412

(Continued)

FOREIGN PATENT DOCUMENTS

DE 2833405 2/1980
JP 2000055866 2/2000

OTHER PUBLICATIONS

Endress+Hauser ("Memosens CPS16D Technical Information", Feb. 1, 2014 XP055342303, cited in ISR and IDS dated Dec. 14, 2018) (Year: 2014).*
Optisys (Optisys CL 1100 technical data sheet for Optisens CL 1100 sensor, published Mar. 2016; accessed at http://www.poweras.com.tr/uploads/docs/cl1100.pdf on Jul. 21, 2021) (Year: 2016).*

(Continued)

*Primary Examiner* — Joshua L Allen
(74) *Attorney, Agent, or Firm* — Ference & Associates LLC

(57) ABSTRACT

An embodiment provides a probe, including: an ion selective shell that includes a pH electrode bathed in an electrolyte and/or buffer solution; a plurality of conductive electrodes coaxially arranged respective to the pH electrode; the plurality of conductive electrodes being electrically isolated on a substrate displaced between the pH electrode and a reference electrode, and including: at least a first conductive electrode that is exposed to sample fluid at a terminal end of the probe proximate to the ion selective shell and disposed on the surface of an electrode substrate proximate to a terminal end of the reference electrode; and at least a second conductive electrode that is exposed to the sample fluid at the terminal end of the probe proximate to the ion selective shell and disposed on the surface of an el electrode substrate (Continued)

proximate to the terminal end of the reference electrode; the probe further including the reference electrode arranged about and along a longitudinal axis of the probe and bathed in a reference buffer and/or electrolyte solution. Other aspects are described and claimed.

22 Claims, 3 Drawing Sheets

(56) References Cited

U.S. PATENT DOCUMENTS

| | | | | |
|---|---|---|---|---|
| 2006/0001431 | A1* | 1/2006 | Adami | G01N 27/4035 324/446 |
| 2009/0014329 | A1* | 1/2009 | Silveri | G01N 27/4168 204/412 |
| 2011/0048971 | A1 | 3/2011 | Bower et al. | |
| 2012/0216605 | A1* | 8/2012 | Silveri | G01N 27/08 73/61.41 |
| 2014/0374251 | A1 | 12/2014 | Soccol et al. | |

OTHER PUBLICATIONS

European Patent Office, Communication pursuant to Article 94(3) EPC, dated Dec. 12, 2019, pp. 4.
Krohne: "OPTISYS CL 1100 Technical Datasheet", Dec. 1, 2012,XP055648994.
Dr Christian Haider: "Electrodes in Potentiometry Monograph", Oct. 1, 2004, pp. 25.
Endress + Hauser: "Memosens CPS16D Technical Information", Feb. 1, 2014, pp. 12.
International Search Report, dated Dec. 12, 2017, pp. 4.
International Searching Authority, Written Opinion of the International Searching Authority, dated Dec. 21, 2017, pp. 7.

* cited by examiner

CHLORINE, OXIDATION—REDUCTION POTENTIAL (ORP), AND PH MEASUREMENT PROBE

FIELD

The subject matter described herein relates to fluid sensors. More specifically, embodiments are directed to an amperometric sensor that may be used to measure chlorine, oxidation-reduction potential, conductivity, and pH of a fluid of interest, e.g., water.

BACKGROUND

Amperometry is an electrochemical technique that measures the change in current resulting from chemical reactions taking place in a fluid (as a function of the analyte concentration). An amperometric sensor may consist of two dissimilar electrodes—an anode and a cathode (e.g., silver/platinum or copper/gold). Below is a general schematic of the reduction-oxidation reaction taking place in the amperometric system:

Cathode (Working Electrode-Reduction of Hypochlorous Acid):

$$HOCl + H^+ + 2e^- \rightarrow Cl^- + H_2O$$

Anode (Reference Electrode):

$$Cl^- + Me \rightarrow MeCl + e^-$$

(Oxidation of Anode)

Amperometric measurement can also be achieved by a three electrode arrangement. In this case, the potential of a working electrode is controlled with respect to a reference electrode to induce reduction or oxidation of an analyte and measuring the resulting current. A third electrode (auxiliary or counter) provides circuit completion for current flow between the working electrode and itself. Below is a general schematic of the reduction-oxidation reaction taking place in the amperometric system:

Cathode (Working Electrode-Reduction of Hypochlorous Acid):

$$HOCl + H^+ + 2e^- \rightarrow Cl^- + H_2O$$

Anode (Auxiliary Electrode):

$$H_2O - 2e^- \rightarrow 2H^+ + \frac{1}{2}O_2$$

Amperometric measurement of free chlorine by membrane-less sensors are highly dependent upon sample flow and pH. Currently, the predominant implementation of such sensors involves the use of a flow controlling cell in which such a chlorine sensor is placed, with the sample fluid being provided from a source to the flow controlling cell or block. The probes or sensors are thus not in a direct, in-pipe location.

Moreover, because of the reduction-oxidation nature of chlorine in water, the state of the art sensors are more highly sensitive and selective to the protonated form of chlorine. Changes in pH can change the distribution of the protonated and unprotonated chlorine species, which results in a change in the measurement concentration of the analyte (e.g., free chlorine) and an error in the measurement accuracy of free chlorine. For example, the protonated and unprotonated species are:

$$HOCl \leftrightarrow H^+ + OCl^-$$

Conventionally, an external pH sensor is incorporated into the flow controlling cell or block, e.g., alongside the chlorine sensor. The measured pH sensor value is used to provide correction to the chlorine measurement to obtain a more accurate free chlorine measurement for samples with changing pH. The current assembly of a pH sensor and a chlorine sensor in the controlling flow cell or block is not as desirable as an in-pipe installation.

At the same time, conventionally it is undesirable to insert more than one sensor into the pipe, as multiple holes or ports must be placed into the pipe to accommodate multiple sensors installations (e.g., chlorine sensor and pH sensor). A compound problem exists in that the best accuracy is obtained when the chlorine sensor and the pH sensor are positioned close to one another. This increases the difficulty of appropriately placing in-pipe probes.

BRIEF SUMMARY

In summary, an embodiment provides a probe, comprising: an ion selective shell that includes a pH electrode bathed in an electrolyte and/or buffer solution; a plurality of conductive electrodes coaxially arranged respective to the pH electrode; the plurality of conductive electrodes being electrically isolated on a substrate displaced between the pH electrode and a reference electrode, and comprising: at least a first conductive electrode that is exposed to sample fluid at a terminal end of the probe proximate to the ion selective shell and disposed on the surface of an electrode substrate proximate to a terminal end of the reference electrode; and at least a second conductive electrode that is exposed to the sample fluid at the terminal end of the probe proximate to the ion selective shell and disposed on the surface of an electrode substrate proximate to the terminal end of the reference electrode; the probe further comprising the reference electrode arranged about and along a longitudinal axis of the probe and bathed in a reference buffer and/or electrolyte solution.

Another embodiment provides a system, comprising: meter electronics; an ion selective shell that includes a pH electrode bathed in an electrolyte and/or buffer solution; a plurality of conductive electrodes coaxially arranged respective to the pH electrode; the conductive electrodes being electrically isolated on a substrate displaced between the pH electrode and a reference electrode, and comprising: at least a first conductive electrode that is exposed to sample fluid at a terminal end of the probe proximate to the ion selective shell and disposed on the surface of an electrode substrate proximate to a terminal end of the reference electrode; and at least a second conductive electrode that is exposed to the sample fluid at the terminal end of the probe proximate to the ion selective shell and disposed on the surface of an electrode substrate proximate to the terminal end of the reference electrode; the reference electrode being arranged about and along a longitudinal axis of the probe and bathed in a reference buffer and/or electrolyte solution; and the meter electronics accessing a program of instructions executable by a processor to: use the pH electrode, the reference electrode, at least a first conductive electrode and at least a second conductive electrode to amperometrically determine a chlorine concentration of a sample fluid.

A further embodiment provides an insertion unit, comprising: an outer housing; a probe disposed in the outer housing; the probe comprising: an ion selective shell that includes a pH electrode bathed in an electrolyte and/or buffer solution; a plurality of conductive electrodes coaxially arranged respective to the pH electrode; the conductive electrodes being electrically isolated on a substrate displaced between the pH electrode and a reference electrode, and comprising: at least a first conductive electrode that is exposed to sample fluid at a terminal end of the probe proximate to the ion selective shell and disposed on the surface of an electrode substrate proximate to a terminal end of the reference electrode; and at least a second conductive electrode that is exposed to the sample fluid at the terminal end of the probe proximate to the ion selective shell and disposed on the surface of an electrode substrate proximate to the terminal end of the reference electrode; the probe further comprising the reference electrode arranged about and along a longitudinal axis of the probe and bathed in a reference buffer and/or electrolyte solution.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
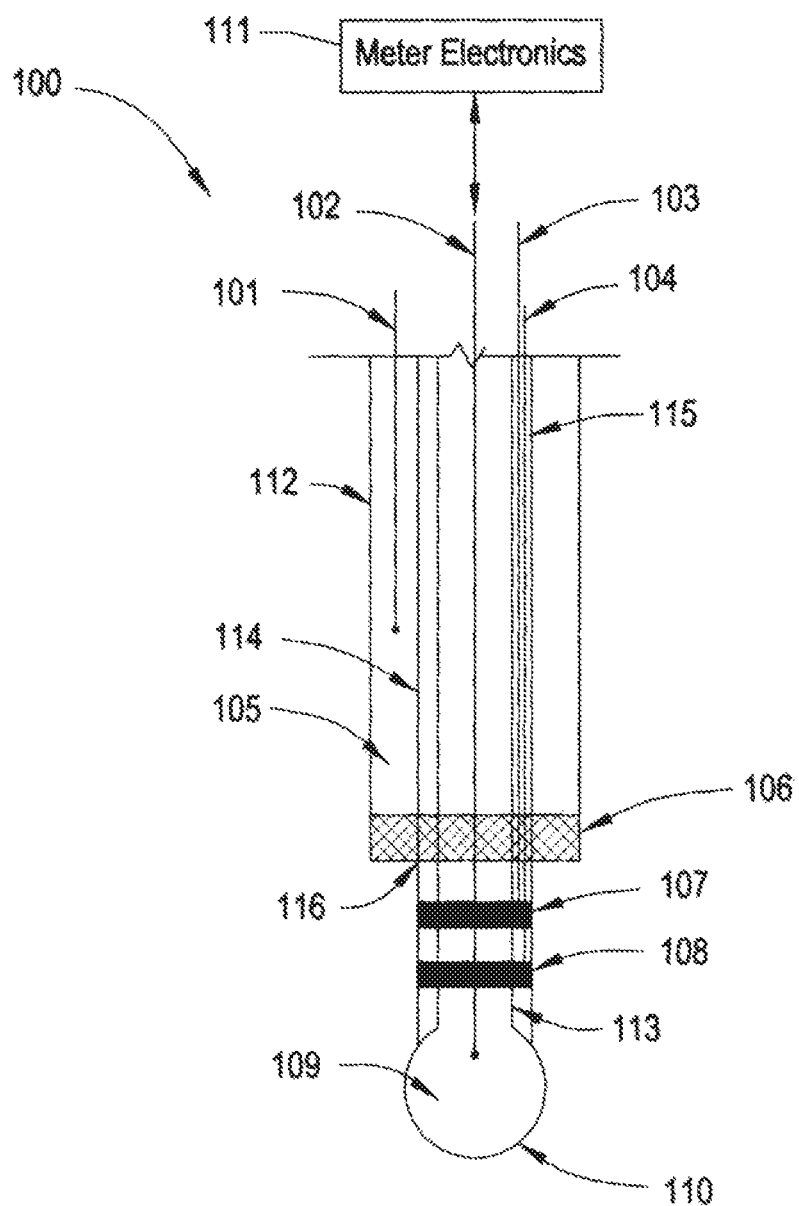
FIG. 1 illustrates an example probe according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner or more embodiments. In the following description, numerous specific details are provided to give a thorough understanding of example embodiments. One skilled in the relevant art will recognize, however, that various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

The various embodiments described herein provide a probe having a combination of sensors, e.g., a chlorine sensor and a pH sensor. An embodiment provides a combined chlorine and pH probe in a single, compact unit that permits in-pipe installation using a single port or inlet.

Currently, there are products, e.g., the Hanna Instruments HI98121 ORP/pH/Temperature testing device, that offer both pH and ORP capabilities. In such a device, a single platinum electrode is mounted around a glass pH sensor, and both are in proximity to a common reference electrode.

In an embodiment, an amperometric mechanism is provided in the probe for chlorine measurement Other amperometric-based analyte measurements may be made. In an embodiment, the same probe or unit is supplied with a potentiometric mechanism to provide pH and/or oxidation-reduction potential (ORP) measurement measuring capabilities. A pH sensor is located at the end of a probe having an annular reference electrode or reference junction around the pH glass, along the longitudinal axis of the probe. Two conductive electrodes, e.g., Pt, Au, or C, or combinations thereof, are annularly placed around the pH electrode. In an embodiment, the two conductive electrodes may be displaced longitudinally along the probe, as further described herein.

The sensor assembly of the probe can be used as a stand-alone probe and/or may be incorporated into a flow controlling cell or block. In either case, the probe may be provided as a compact unit for in-pipe installations using a single port or inlet.

In an embodiment, during measurement a reference electrode may be used with the pH electrode to potentiometrically determine pH of the sample fluid. In an embodiment, at least one of the conductive electrodes, e.g., a Pt electrode, may be used with the reference electrode to potentiometrically determine ORP for the sample fluid.

In a separate operation, the two conductive electrodes may be employed as a working and auxiliary electrode, along with the reference electrode, in order to measure chlorine amperometrically. Electrochemical pulse methods may be employed during this procedure in order to maintain clean electrode surfaces for both chlorine and ORP measurements.

In a separate operation, at least two conductive electrodes may be used to determine the conductivity of the sample fluid. In another embodiment, the conductivity of a sample fluid may be determined by using two conductive electrodes as drive electrodes and two conductive electrodes as sense electrodes in a four-electrode conductivity sensor arrangement.

In an embodiment, a reference electrode may have a single or double junction configuration, e.g., formed of glass, fiberglass or other junction material. Standard Ag/AgCl or Calomel reference configurations may also be utilized. A pseudo reference electrode may be employed in place of the reference junction an embodiment. Addition of a ground rod to the probe, such that the ground rod contacts the sample fluid, enables the use of a differential pH sensor configuration, e.g., if a pH reference electrode in a buffered fill solution configuration is utilized. A thermistor or other temperature sensing element may be incorporated for temperature compensation.

The illustrated example embodiments will be best understood by reference to the figures. The following description is intended only by way of example, and simply, illustrates certain example embodiments.

Illustrated in FIG. 1 is a probe 100 that permits measurement of pH, chlorine (free chlorine), conductivity, and/or fluid ORP. As shown, the probe 100 includes a pH sensor in the form of a pH electrode 102 bathed in pH till solution 109. The pH sensitive glass 110 or other ion sensitive material permits pH sensing in combination with reference electrode 101, itself surrounded by reference till solution 105. A reference junction 106 and reference electrode fill solution housing 112 is provided in the probe 100 to form a completed pH sensing unit.

The probe 100 additionally includes two electrodes 107, 108 formed in a longitudinally spaced arrangement along the length of the probe 100. The electrodes 107, 108 permit amperometric measurement of chlorine in a sample fluid, as the electrodes 107, 108 are placed in the sample fluid (not illustrated in FIG. 1). The electrode 107 is connected to an electrode lead 103 that operatively couples the electrode 107 to meter electronics 111. The electrode lead 104 likewise communicatively couples the electrode 108 to meter electronics 111. The meter electronics 111 may be in physical contact with the leads 103, 104, and/or other components of the probe 100. Alternatively, the meter electronics 111 may be wirelessly coupled to the leads 103, 104 and/or other components of the probe 100.

One or more of the electrode leads 103, 104 may be placed within a chamber 115 defined by an outer surface of pH electrode glass 113 (e.g., along the surface of insulating glass tube that terminates in a bulb or other shaped element containing pH glass 110) and an interior surface of the reference electrode housing 114. The defined chamber 115 containing the leads 103, 104 may include air, other gas, or insulating material. The leads 103, 104 may be shielded from the fluid sample and external environment via a sealing mechanism enclosing the ends of the chamber containing the leads 103, 104, e.g., application of epoxy or other resin at junction 116, among other places. One or more of the electrode leads 103, 104 may be coated with an epoxy or resin material to shield the electrode leads 103, 104 from the external contamination.

The probe 100 may include electrodes 107, 108 of two dissimilar types, e.g., an anode 107 and a cathode 108, for example formed of silver/platinum and copper/gold, respectively. The probe 100 may include electrodes 107, 108 being comprised of similar materials, e.g., an anode 107 and a cathode 108, for example formed of platinum/platinum. Generally, the electrodes 107, 108 may be formed as bands or foils that are adhered to the insulating glass of the pH probe 100, i.e., adhered above the pH glass bulb 110. The electrodes 107, 108 are in contact with the fluid sample, with or without a membrane covering.

Meter electronics 111, which may be operatively coupled by wired or wireless connection to the electrodes 107, 108, and more particularly to electrode leads 103, 104, respectively, and reference electrode 101, and/or operatively coupled by wired or wireless connection to pH electrode 102, or a combination of the foregoing, permit pH measurement and a amperometric chlorine measurement, as well as ORP and conductivity measurement, as further described herein.

For example, in an embodiment, the meter electronics 111 include a memory device that stores a program of instructions for completing pH measurements using signals from the pH electrode 102 and the reference electrode 101. The meter electronics 111 may also store in a memory device a program of instructions for completing amperometric measurements of chlorine in a fluid sample using signals from electrodes 107, 108 and reference electrode 101. In an embodiment, the meter electronics 111 may include a processor that executes the program of instructions to perform pH measurements and/or amperometric measurements for the fluid sample. Likewise, meter electronics 111 may execute a program of instructions for measuring pH and ORP of a sample fluid using reference electrode 101, pH electrode 102, or one of the conductive electrodes 107, 108; respectively. Likewise meter electronics 111 may execute a program of instructions for operating a two- or four-electrode conductivity sensor.

Figure 2:
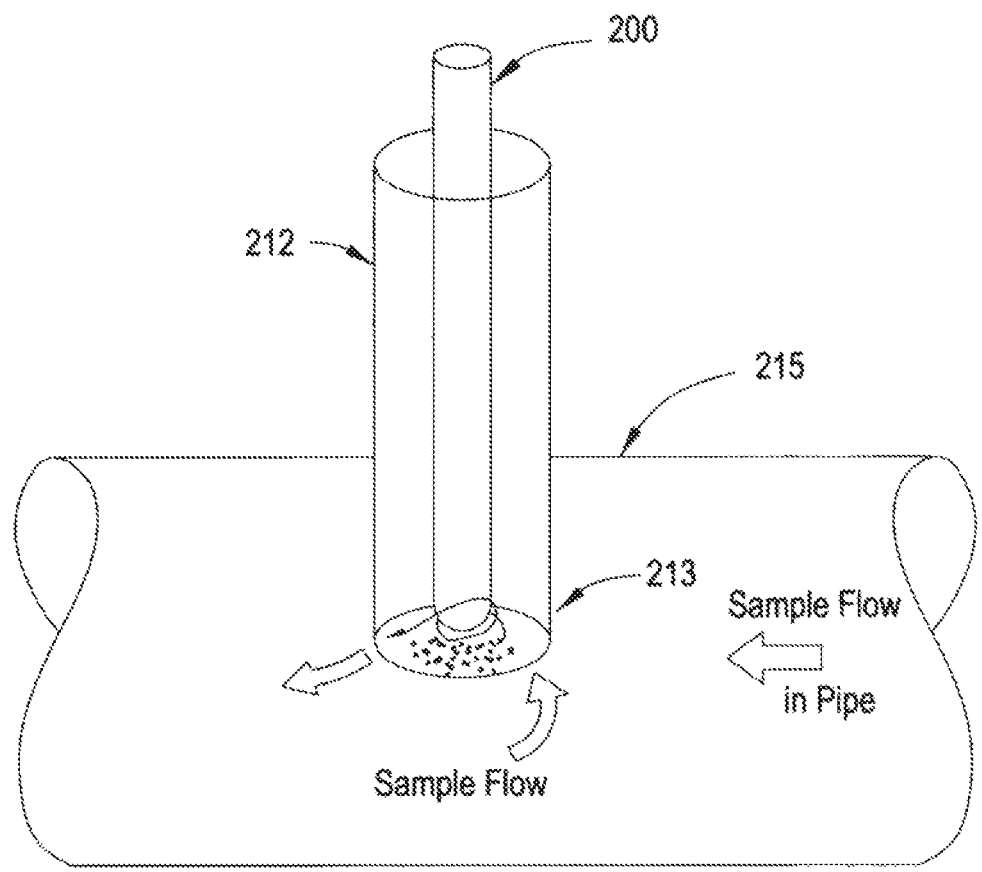
FIG. 2 illustrates an example system with flow control according to an embodiment.

Because an embodiment provides a probe 100 that is capable of both pH and amperometric chlorine measurements, the probe 100 may be inserted as a unit for single inlet, in-pipe installations. As shown in FIG. 2, the probe 200 may be incorporated into an unit 212 that includes the probe 200 and a flow controlling cell 213 at one end thereof. The insert unit 212 may be placed within an inlet or port within a sample pipe 215 for measuring chlorine content of the sample fluid flowing through the sample pipe 215.

The probe 200 is provided for in-pipe measurement of chlorine content of the sample fluid, as corrected for pH (as well as temperature, as described herein).

As referred to herein, a probe according to an embodiment may also be utilized for ORP measurements, e.g., using one of the two or more electrodes provisioned for amperometric chlorine content measurement. By way of example, FIG. 3 illustrates a method of utilizing a probe according to any of the embodiments for chlorine measurement, pH measurement, conductivity, ORP measurement, or a combination of the foregoing.

Figure 3:
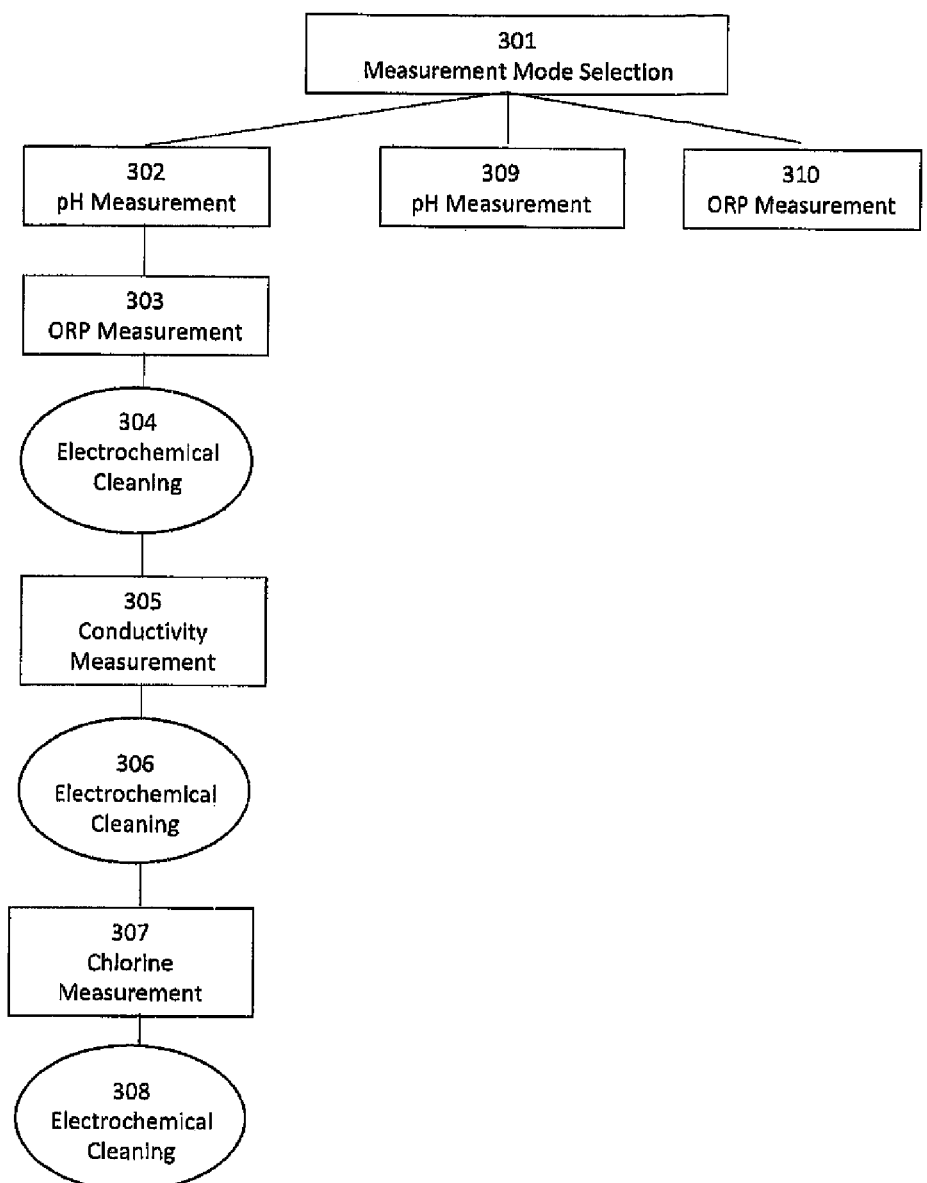
FIG. 3 illustrates an example method of obtaining sequential pH, ORP, conductivity, and amperometric chlorine measurements according to an embodiment.

As shown in FIG. 3, an embodiment may implement a method provided by a program of instructions. For example, a routine or program of instructions, e.g., as stored or accessed by meter electronics, and executed by a processor thereof, may be loaded that indicates a measurement mode at 301. For example, the measurement mode may be for measuring pH, chlorine, and/or ORP. As indicated in FIG. 3, if it is determined that both amperometric chlorine measurement and ORP measurement of the sample fluid is dictated by the program of instructions, an embodiment may sequentially, utilize the electrodes of the probe to obtain the requisite measurements of the sample fluid needed.

By way of non-limiting example, at 302 an embodiment may utilize a reference electrode with a pH electrode to potentiometrically determine pH of the sample fluid. At 303 and embodiment may utilize a reference electrode with at least one of the conductive electrodes, i.e., Pt electrode, and potentiometrically determines ORP for the sample fluid. Thereafter, at 304 an electrochemical pulse may be employed in order to clean electrode surfaces for a subsequent measurement.

By way of non-limiting example, at 305 an embodiment may utilize at least two of the conductive electrodes, e.g., Pt electrodes, to determine conductivity for the sample fluid. Additionally, by way of non-limiting example, at 305 an embodiment may utilize at least two pairs of the conductive electrodes, e.g., Pt electrodes, to determine conductivity for the sample fluid. Thereafter, at 306 an electrochemical pulse may be employed in order to clean electrode surfaces for a subsequent measurement.

In a separate operation, at 307, the two conductive electrodes may be employed as a working and auxiliary electrode along with the reference electrode in order to measure chlorine amperometrically. Thereafter, at 308, another electrochemical pulse may be employed in order to maintain clean electrode surfaces for subsequent measurements.

If it is determined that a pH only mode or an ORP only mode, by example, are indicated at 301, an embodiment may proceed to measure the pH of the sample fluid as indicated at 309 or may proceed to measure only the ORP, as indicated at 310.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it s to be understood that the embodiments are not limited to those precise embodiments, and that various other changes and modifications may be affected therein by one skilled in the art without departing from the scope or spirit of the disclosure.

What is claimed is:

1. A probe, comprising:
an ion selective glass shell that includes a pH electrode bathed in an electrolyte and/or buffer solution;
a plurality of conductive electrodes coaxially arranged respective to the pH electrode;
the plurality of conductive electrodes being electrically isolated on a substrate displaced between the pH electrode and a reference electrode, and comprising:
at least a first conductive electrode of the plurality of conductive electrodes that is exposed to a sample fluid at a terminal end of the probe proximate to the ion selective glass shell and disposed on a surface of an electrode substrate proximate to a terminal end of the reference electrode, wherein a first electrode lead that connects the first conductive electrode to meter electronics is disposed within a chamber defined by an outer surface of the substrate and an interior surface of a reference electrode housing; and
at least a second conductive electrode of the plurality of conductive electrodes that is exposed to the sample fluid at the terminal end of the probe proximate to the ion selective glass shell and disposed on the surface of the electrode substrate proximate to the terminal end of the reference electrode, wherein a second electrode lead that connects the second conductive electrode to the meter electronics is disposed within the chamber defined by the outer surface of the substrate and the interior surface of the reference electrode housing;
the probe further comprising the reference electrode arranged about and along a longitudinal axis of the probe and bathed in a reference buffer and/or electrolyte solution.

2. The probe of claim 1, wherein the first conductive electrode and the second conductive electrode are longitudinally displaced from one another along a length of the probe.

3. The probe of claim 2, wherein the ion selective glass shell comprises pH glass at the terminal end and an insulating glass stem.

4. The probe of claim 3, wherein the plurality of conductive electrodes are adhered to the insulating glass stem.

5. The probe of claim 1, wherein the plurality of conductive electrodes are coaxially arranged about the terminal end of the probe.

6. The probe of claim 1, wherein the plurality of conductive electrodes each comprise a band electrode.

7. The probe of claim 6, wherein the band electrode comprises a conductive foil.

8. The probe of claim 6, wherein the plurality of conductive electrodes are selected from the group consisting of Au, Pt and C.

9. A system, comprising:
meter electronics;
an ion selective glass shell that includes a pH electrode bathed in an electrolyte and/or buffer solution;
a plurality of conductive electrodes coaxially arranged respective to the pH electrode;
the plurality of conductive electrodes being electrically isolated on a substrate displaced between the pH electrode and a reference electrode, and comprising:
at least a first conductive electrode of the plurality of conductive electrodes that is exposed to a sample fluid at a terminal end of a probe proximate to the ion selective glass shell and disposed on a surface of an electrode substrate proximate to a terminal end of the reference electrode, wherein a first electrode lead that connects the first conductive electrode to the meter electronics is disposed within a chamber defined by an outer surface of the substrate and an interior surface of a reference electrode housing; and
at least a second conductive electrode of the plurality of conductive electrodes that is exposed to the sample fluid at the terminal end of the probe proximate to the ion selective glass shell and disposed on the surface of the electrode substrate proximate to the terminal end of the reference electrode, wherein a second electrode lead that connects the second conductive electrode to the meter electronics is disposed within the chamber defined by the outer surface of the substrate and the interior surface of the reference electrode housing;
the reference electrode being arranged about and along a longitudinal axis of the probe and bathed in a reference buffer and/or electrolyte solution; and
the meter electronics accessing a program of instructions executable by a processor to:
use the pH electrode, the reference electrode, the first conductive electrode and the second conductive electrode to amperometrically determine a chlorine concentration of the sample fluid.

10. The system of claim 9, wherein the chlorine concentration is adjusted for pH of the sample fluid.

11. The system of claim 9, wherein the program of instructions separately determine the chlorine concentration and pH of the sample fluid.

12. The system of claim 9, wherein the program of instructions are further executable by the processor to use the reference electrode, and the first conductive electrode to determine oxidation reduction potential (ORP) of the sample fluid.

13. The system of claim 12, wherein the program of instructions sequentially determine the chlorine concentration and the ORP of the sample fluid.

14. The system of claim 13, wherein the program of instructions includes a pulse provided to the first conductive electrode and the second conductive electrode as part of sequential determination of the chlorine concentration and the ORP of the sample fluid.

15. The system of claim 9, wherein the program of instructions are further executable by the processor to use the reference electrode, the first conductive electrode and the second conductive electrode for determination of a conductivity of the sample fluid.

16. The system of claim 9, wherein the program of instructions are further executable by the processor to use the reference electrode, the first conductive electrode and the second conductive electrode to be drive electrodes and the first conductive electrode and the second conductive electrode to be sensing electrodes for determination of conductivity of the sample fluid.

17. An insertion unit, comprising:
an outer housing;
a probe disposed in the outer housing;
the probe comprising:
an ion selective glass shell that includes a pH electrode bathed in an electrolyte and/or buffer solution;
a plurality of conductive electrodes coaxially arranged respective to the pH electrode;
the plurality of conductive electrodes being electrically isolated on a substrate displaced between the pH electrode and a reference electrode, and comprising:
at least a first conductive electrode of the plurality of conductive electrodes that is exposed to a sample fluid at a terminal end of the probe proximate to the ion selective glass shell and disposed on a surface of an electrode substrate proximate to a terminal end of the reference electrode, wherein a first electrode lead that connects the first conductive electrode to meter electronics is disposed within a chamber defined by an outer surface of the substrate and an interior surface of a reference electrode housing; and
at least a second conductive electrode of the plurality of conductive electrodes that is exposed to the sample fluid at the terminal end of the probe proximate to the ion selective glass shell and disposed on the surface of the electrode substrate proximate to the terminal end of the reference electrode, wherein a second electrode lead that connects the second conductive electrode to the meter electronics is disposed within the chamber defined by the outer surface of the substrate and the interior surface of the reference electrode housing;
the probe further comprising the reference electrode arranged about and along a longitudinal axis of the probe and bathed in a reference buffer and/or electrolyte solution.

18. The insertion unit of claim 17, further comprising:
a flow control within the outer housing that controls flow of the sample fluid therethrough.

19. The insertion unit of claim 17, further comprising at least one data port disposed at an end of the outer housing.

20. The insertion unit of claim 19, wherein the at least one data port comprises a data connection for operatively coupling the meter electronics.

21. The insertion unit of claim 20, wherein the at least one data port comprises a plurality of pins.

22. The insertion unit of claim 21, wherein the at least one data port comprises a wireless communication device.

* * * * *